(12) United States Patent
Petronek

(10) Patent No.: US 9,964,428 B2
(45) Date of Patent: May 8, 2018

(54) EQUALIZED HYDRAULIC CLAMP FORCE CONTROL

(75) Inventor: David W. Petronek, Boring, OR (US)

(73) Assignee: Cascade Corporation, Fairview, OR (US)

(*) Notice: Subject to any disclaimer, the term of this patent is extended or adjusted under 35 U.S.C. 154(b) by 1586 days.

(21) Appl. No.: 12/543,279

(22) Filed: Aug. 18, 2009

(65) Prior Publication Data

US 2010/0089704 A1 Apr. 15, 2010

Related U.S. Application Data

(63) Continuation-in-part of application No. 12/248,245, filed on Oct. 9, 2008.

(51) Int. Cl.
| | |
|---|---|
| *B66F 9/22* | (2006.01) |
| *G01G 19/10* | (2006.01) |
| *B66F 9/18* | (2006.01) |

(52) U.S. Cl.
CPC .......... *G01G 19/10* (2013.01); *B66F 9/183* (2013.01); *B66F 9/184* (2013.01); *B66F 9/22* (2013.01)

(58) Field of Classification Search
CPC .................................................. G01G 19/10
See application file for complete search history.

(56) References Cited

U.S. PATENT DOCUMENTS

| | | |
|---|---|---|
| 3,865,424 A | 2/1975 | Jabhowski |
| 4,431,365 A | 2/1984 | Sturz, Jr. |
| 4,491,190 A * | 1/1985 | Mayfield ................ G01G 19/10 |
| | | 177/139 |
| 4,921,385 A * | 5/1990 | Okuno ............................ 414/21 |

(Continued)

FOREIGN PATENT DOCUMENTS

| | | |
|---|---|---|
| DE | 942349 | 5/1956 |
| DE | 3245715 | 12/1982 |

(Continued)

OTHER PUBLICATIONS

International Search Report, PCT/US2009/055539, EPO, dated Apr. 20, 2010, pp. 1-7.*

*Primary Examiner* — Michael R Mansen
(74) *Attorney, Agent, or Firm* — Chernoff, Vilhauer, McClung & Stenzel, LLP

(57) ABSTRACT

Hydraulic valve circuitry adapted for automatic weight-responsive control of load-clamping members of a load-lifting system having a free lift mast. The load-lifting system generally includes one or more fluid power actuator for applying a gripping force to a load, at least one elongate, longitudinally-extensible fluid power lifting device having a free lift range of motion and at least one main lift range of motion, and manually operated load-clamping and load-lifting selector valves. The hydraulic valve circuitry provides, independently, weight-responsive control of the load-clamping members when lifting a load, full-time automatic weight-responsive force control of the load-clamping members without concurrent manual actuation of load-clamping or load-lifting selector valves, and equalization of sensed load weight so that the sensed load weight is substantially independent of the longitudinally-extensible position of the lifting device.

3 Claims, 2 Drawing Sheets

(56) References Cited

U.S. PATENT DOCUMENTS

| | | | |
|---|---|---|---|
| 5,666,295 A * | 9/1997 | Bruns | G01G 19/10 |
| | | | 702/138 |
| 6,027,302 A | 2/2000 | Nilsson | |
| 6,390,751 B2 | 5/2002 | Jordan et al. | |
| 6,454,511 B1 * | 9/2002 | Jordan et al. | 414/621 |
| 6,843,636 B2 | 1/2005 | Jordan et al. | |
| 7,018,159 B2 | 3/2006 | Jordan et al. | |
| 7,412,919 B2 | 8/2008 | Chase | |
| 2004/0133384 A1 * | 7/2004 | Allerding | G01G 19/10 |
| | | | 702/173 |
| 2006/0073001 A1 | 4/2006 | Chase | |
| 2010/0089704 A1 * | 4/2010 | Petronek | 187/224 |

FOREIGN PATENT DOCUMENTS

| | | | |
|---|---|---|---|
| EP | 995557 A2 * | 4/2000 | B25J 15/02 |
| EP | 1657030 | 5/2006 | |
| EP | 2128077 A1 * | 12/2009 | B66F 9/22 |
| JP | 5490752 A | 7/1979 | |
| JP | 54090752 A * | 7/1979 | B66F 9/22 |
| JP | 238686 | 9/1993 | |
| WO | WO 2006/085824 | 8/2006 | |
| WO | WO 2008/011714 | 1/2008 | |
| WO | WO 2010042283 A2 * | 4/2010 | B66F 9/18 |

* cited by examiner

EQUALIZED HYDRAULIC CLAMP FORCE CONTROL

CROSS-REFERENCE TO RELATED APPLICATIONS

This application is a continuation-in-part of application Ser. No. 12/248,245, filed Oct. 9, 2008.

BACKGROUND OF THE INVENTION

This disclosure relates generally to hydraulic valve circuits for use with material handling equipment and, more particularly, to hydraulic valve circuits adapted for weight-responsive control of clamping members associated with material handling equipment having free lift masts.

Standard forklifts and other types of material handling equipment typically have mast assemblies for hoisting or lifting a load from one height to another, and such mast assemblies are typically configured to receive a variety of attachments that may be designed for handling particular types of loads. For example, load-clamping attachments such as carton clamps or paper roll clamps may be used, each having hydraulically controllable load-clamping members for imparting sufficient gripping forces on the sides of a load to allow lifting and carrying the load from one place to another.

Mast assemblies are typically one of two general types—"free lift" or "non-free lift." Free lift masts permit lifting a load from one height to another throughout a "free lift" range of motion without a corresponding change in the overall height of the mast assembly. Lifting the load beyond the free lift range of motion requires the mast to telescope so as to extend the range of lifting. The mast may have several stages which telescope in succession, one after the other. Each stage will generally have one or more extensible hydraulic cylinders which, when activated, extend fully before activation of the one or more extensible hydraulic cylinders associated with the next stage. The hydraulic cylinders in each successive stage usually require higher hoist pressures for activation than cylinders of the preceding stage. Consequently, in a free lift mast having, for example, a free lift range of lifting motion and a main lift range of lifting motion, the main lift cylinder or cylinders will not begin to extend until the free lift cylinder or cylinders have reached their fully extended position.

By contrast, non-free lift masts begin to telescope immediately as the load is lifted. Such telescoping of the mast is undesirable in overhead constrained environments. For example, the interior of enclosed tractor trailers may be limited to, for example, an inside height of 104 inches. If the particular lift truck has a collapsed mast height of between 79 to 84 inches, as is common for counterbalanced sit-down lift trucks, there may be only 20 to 25 inches of vertical space available for the mast to telescope before further telescoping of the mast interferes with the ceiling of the trailer.

In part because free lift masts typically require stepped or progressively higher hoist line pressures for extending the mast beyond the free lift range of motion, principally hydraulic control systems adapted to utilize hoist line pressures for sensing load weight and correspondingly regulating gripping forces automatically in response to such pressures have not been achieved with such masts. Alternative designs using electronic controllers for such gripping force regulation have disadvantages such as higher unit costs and added system complexity, as well as the requirement for electrical conductors which must be movable in response to mast extension. Therefore, different hydraulic valve circuits are needed for automatic weight-responsive force control of load-clamping members associated with material handling systems having free lift masts.

BRIEF DESCRIPTION OF THE DRAWINGS

For a more complete understanding of the present invention, the drawings herein illustrate exemplary hydraulic circuitry in accordance with various embodiments of the invention. The drawings, however, do not limit the scope of the invention.

DETAILED DESCRIPTION OF PREFERRED EMBODIMENTS

In the following detailed description, numerous specific details are set forth in order to provide a thorough understanding of various embodiments. However, those skilled in the art will understand that the present invention may be practiced without these specific details, that the present invention is not limited to the described embodiments, and that the present invention may be practiced in a variety of alternate embodiments. In other instances, well known methods, procedures, components, and systems have not been described in detail.

Figure 1:
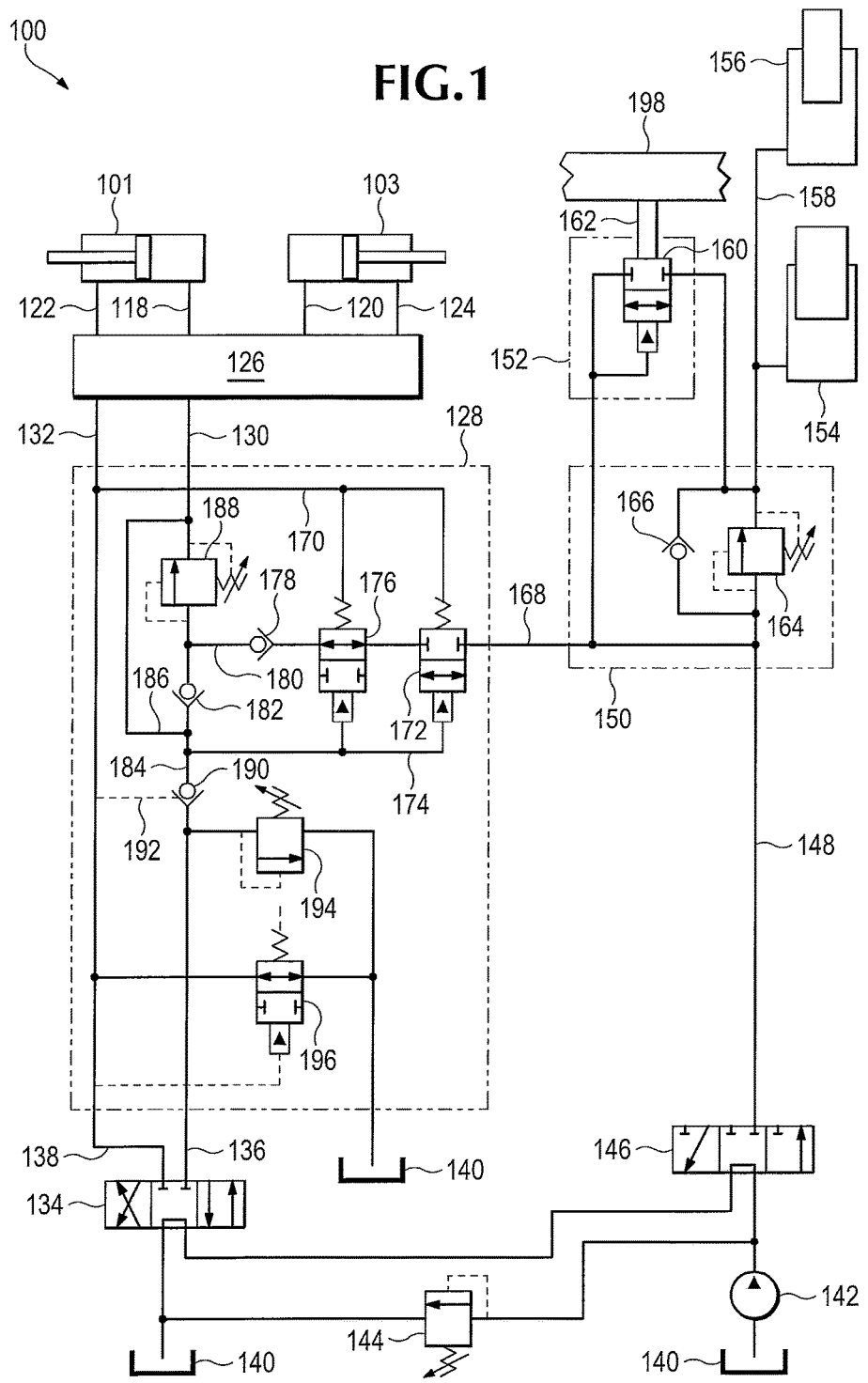
FIG. 1 is a schematic of a load-lifting system having a free lift mast and various hydraulic valve circuitry adapted for weight-responsive control of load-clamping members, in accordance with various embodiments.

An exemplary circuit diagram of a load-lifting system 100 having a free lift mast and various hydraulic valve circuitry adapted for weight-responsive control of load-clamping members in such a system is provided in FIG. 1. The system 100, as shown, generally includes one or more fluid power actuators 101, 103 capable of operating in unison to apply a gripping force to a load held between load-clamping members (not shown). At least one elongate, longitudinally-extensible fluid power lifting device shown schematically in FIG. 1 has a free lift stage 154 and a main lift stage 156. Manually operated load-clamping 134 and load-lifting 146 selector valves, and various hydraulic valve circuitry for controlling the operation of the fluid power actuators 101, 103 and lifting device 154, 156 in response to manual operation of the selector valves 134, 146, are provided.

The load-clamping members, at least one of which is controllable by one or more of the fluid power actuators 101, 103, may comprise paper roll clamp arms or any type of load-clamping members controllable by at least one fluid power actuator. For example, the load-clamping members may comprise clamping arms in a carton clamp attachment. For purposes of this disclosure, however, the load-lifting system 100 will be described in the context of a paper roll clamp attachment having a pair of load-clamping members arranged for operation in tandem, each load-clamping member controlled by one of the fluid power actuators 101, 103. In a tandem arrangement, the fluid power actuators 101, 103 may be configured for closing the load-clamping members as hydraulic fluid is introduced into the head sides of the fluid power actuators (or cylinders) 101, 103 via fluid lines (or hydraulic fluid conduits) 118, 120 and as hydraulic fluid is concurrently exhausted from the rod sides of the fluid power actuators 101, 103 via fluid lines 122, 124.

Each of the power actuators 101, 103 may be controlled by a load-clamping valve assembly 126, which comprises hydraulic circuitry for closing or opening the load-clamping members. The specific circuitry used for the load-clamping valve 126 may comprise conventional circuitry for operating at least one of the power actuators 101, 103 for selectively closing or opening load-clamping member in response to at least one load-clamp-closing line (or hydraulic fluid conduit) 130 and at least one load-clamp-opening line 132. The load-clamping valve assembly 126 may, for example, include pilot-operated check valves and associated circuitry for controlling the clamping members of a paper roll clamp attachment. As another example, the load-clamping valve assembly 126 may include pilot-operated check valves and a fluid divider/combiner for controlling the clamping members of a carton clamp attachment.

As shown schematically in FIG. 1, the lifting system 100 includes at least one elongate, longitudinally-extensible fluid power lifting device 154, 156, which has a free lift stage 154 and at least one main lift stage 156. The lifting device 154, 156 may be a single, multiple stage fluid power device having a free lift range of motion (shown schematically in FIG. 1 as 154) and at least one main lift range of motion (shown schematically in FIG. 1 as 156). The lifting device 154, 156 may, however, comprise an assembly of fluid power devices configured to have a free lift range of longitudinal movement for lifting the load-clamping members without unfolding of the mast and at least one main lift range of longitudinal movement whereby the mast unfolds as the lifting device extends. As shown schematically, the free lift stage 154 requires a lower fluid pressure in line 158 for extensible actuation than the main lift stage 156 because the free lift stage 154 piston has a larger pressure surface area than the main lift stage 156 piston. Consequently, increasing hydraulic fluid to line 158 causes extension of the free lift stage 154 until its end of travel, after which increasing fluid to line 158 causes the main lift stage 156 to begin to extend.

The hydraulic valve circuitry in FIG. 1 is shown grouped into three different modules or valve assemblies 128, 150, and 152, although various components may be grouped differently or grouped into a different number of modules or valve assemblies. The circuitry in 150 and 152 may, for example, comprise a single module or valve assembly. Further, portions of the circuitry in FIG. 1 may be used independently or with substituted circuitry. For example, the circuitry in 150 and 152 may be used with circuitry different than that shown in 128.

The hydraulic valve circuitry grouped into the valve assembly 128, as shown, comprises circuitry for receiving a sensed load weight in line 168 from hydraulic circuitry associated with the lifting device 154, 156, and for using the sensed load weight for weight-responsive control of the load-clamping members. The hydraulic valve circuitry grouped into the valve assemblies 150 and 152 include circuitry for ensuring that the sensed load weight received in line 168 is equalized so as to be substantially independent of the longitudinally-extensible position of the lifting device 154, 156, and for enabling the cylinder or cylinders that comprise the lifting device 154, 156 to act as accumulators when the load-clamping 134 and load-lifting 146 selector valves are closed, thereby providing the load-lifting system 100 with full-time automatic weight-responsive force control of the load-clamping members.

The hydraulic valve circuitry shown in the valve assembly 128 includes load-clamp-closing circuitry for receiving hydraulic fluid from a load-clamping selector valve 134. For example, an operator of a lift truck equipped with a load-lifting system 100 for handling paper rolls may initiate closure of the load-clamping members by moving a load-clamping selector valve 134 to cause hydraulic fluid to flow from pump 142 into load-clamp-closing line 136, unseat the pilot-operated valve 190, and continue flowing to the load-clamping valve 126 via first fluid conduit 186 and then fluid conduit 130. As the fluid is introduced into the load-clamp-closing line 130, hydraulic fluid is concurrently exhausted through the load-clamp-opening line 132. The spring biased, normally open two-way valve 196 provides a path for fluid exhausted through the load-clamp-opening line 132 to return to the reservoir (or tank) 140. The two-way valve 196 is shown piloted from the load-clamp-opening line 138 causing the valve to move to a closed, no flow position when the load-clamping selector valve 134 is positioned for increasing fluid pressure in the load-clamp-opening line 138. Safety relief valve 144 is provided to return fluid back to the reservoir 140 if excessive pressure develops in the system 100.

As the load-clamping members close upon the load, imposing a gripping force upon the sides of the load, hydraulic pressure in the load-clamp-closing line 136 increases to a desired threshold (or starting) gripping pressure by an adjustable pressure relief valve 194 or other suitable valve. For example, the pressure relief valve 194 may be set to limit the load-clamp-closing line 136 to 650 psi so that hydraulic fluid from the load-clamping selector valve 134 exceeding this limit is returned to the lift truck reservoir 140 rather than allowed to continue to increase the gripping pressure imposed on the clamped load.

As the fluid pressure increases in the load-clamp-closing line 136 up to the setting of the pressure relief valve 194, i.e. the threshold pressure, the fluid pressure sensed immediately downstream of the pilot-operated check valve 190, at 184, also increases up to the threshold pressure. The pilot line 174 receives the sensed pressure at 184 for controlling the position of two pilot-operated, adjustably spring biased two-position valves 172, 176, which are used to selectively control the range of fluid pressure accepted from line 168 and hydraulic circuitry associated with the lifting device 154, 156. The valve 172 is preferably used to set a lower pressure limit below which the load-clamp-closing circuitry is hydraulically decoupled from the load-lifting circuitry, and the valve 176 is preferably used to set a maximum clamping pressure above which the load-clamp-closing circuitry is hydraulically decoupled from the load-lifting circuitry. The two-position valve 176 is shown as a normally open valve, allowing fluid flow unless piloted by line 174 into a closed or no fluid flow state, whereas the two-position valve 172 is shown as a normally closed valve, blocking fluid flow unless piloted by line 174 into an open, fluid flow state. Each of the two-position valves 172, 176 is spring biased so as to remain in its normal state until the pilot line pressure exceeds the setting of the spring resistance. Pressure in the load-clamp-opening line 132 and spring override line 170 causes the valves 172, 176 to return to their normal state. Pressure in the load-clamp-opening line 132, 138 also unseats the check valve 190 via pilot line 192 allowing fluid to drain from the load-clamp-closing circuitry.

Preferably the spring resistance setting for valve 172 is less than the threshold or starting pressure setting for the pressure relief valve 194 yet high enough to prevent the load-clamping members from drifting downward as they are being closed for gripping the load. Typical spring resistance settings may be 600 psi for the spring in valve 172 and 1800 psi for the spring in valve 176. Once the fluid pressure sensed at 184 reaches the spring setting of valve 172, or 600 psi, for example, valve 172 opens to allow fluid pressure to be sensed downstream of now open valve 172, downstream of the normally open valve 176, and also downstream of check valve 178. When both valves 172 and 176 are open, fluid pressure from line 168, and thereby the weight of the load, may be sensed at 180. Until valve 172 opens, the pressure in the load-clamp-closing circuitry is decoupled from pressure in the hoist lines 148 and 168. Only when both of the two-position valves 176 and 172 are open is fluid from line 168 able to be received into the load-clamp-closing circuitry at 180. The check valve 178 prevents fluid from the load-clamp-closing circuitry from flowing through line 168 back into the load-lifting circuitry.

The check valve 182 prevents fluid from the line 168 from flowing upstream in the load-clamp-closing circuitry, instead forcing fluid to flow through the pressure regulating valve 188. The pressure regulating valve 188 may be used to adjust the clamping pressure applied by the load-clamping members in relation to weight-proportional fluid pressure received through the line 168. For example, for a lifting system having larger capacity fluid power actuators 101, 103, the weight-proportional hydraulic pressure received from the line 168 may result in excessive gripping forces exerted on the load. In such cases the pressure regulating valve 188 may be used to reduce the maximum pressure available for gripping the load. Other factors such as the fragility and stability of certain types of loads, the size and capacity of the load-lifting cylinder or cylinders comprising the lifting device 154, 156, and, as will be described in greater detail below, the pressure intensification effects of pressure equalizing circuitry 150 associated with the lifting device 154, 156 may require reducing the clamping pressure received from line 168.

Any suitable type of pressure regulating valve variably responsive to the pressure in line 168 can be used in the position of valve 188, including one or more pilot-controlled relief valves or pressure reducing valves.

During a load-lifting operation, after the threshold pressure is reached for clamping the load the load-clamping selector valve 134 is returned to its centered, unactuated position, and the hoist or load-lifting selector valve 146 is moved to allow hydraulic fluid to flow from pump 142 into hoist actuating line 148 for extending the lifting device 154, 156 to lift the load. If the fluid conduits 148, 158, and 168 are simply interconnected together, the relationship between load weight sensed at line 168 and the hydraulic pressure in the line 168 would vary depending upon the position of the lifting device 154, 156 because lifting the load in free lift 154 requires less hydraulic pressure than lifting the same load in main lift 156. The main lift stage 156 may, for example, require an additional 400 psi of hydraulic pressure for activation. Consequently, the load weight signal available from such a lifting system varies depending upon whether the lifting device is in free lift or main lift.

The hydraulic valve circuitry grouped into the valve assemblies 150 and 152 includes circuitry for ensuring that the sensed load weight received in line 168 is equalized so as to be substantially independent of the longitudinally-extensible position of the lifting device 154, 156. As shown, the exemplary valve assembly 150 includes a pressure-differential regulating valve 164 that compensates for the difference in actuation pressures between free lift cylinder 154 and main lift cylinder 156. The pressure regulating valve 164 may be adjusted, for example, to reduce the pressure in line 158 by 400 psi to operate the free lift cylinder 154, as compared with the higher downstream pressure required in line 158 to operate the smaller-area piston of the main lift cylinder 156. During operation of the free lift cylinder 154 the pressure in line 148 is effectively intensified by the valve 164 so as to equalize the sensed load weight in line 168 to that which naturally occurs during operation of the main lift cylinder 156.

During free lift 154, as the load is lifted without telescoping of the mast, the main lift stage 156 remains stationary. In one embodiment, a valve assembly 152, comprising a normally closed, plunger-activated two-way valve 160, is mounted to a cross member of the lowest (fixed) mast section below a cross member 198 of the movable main lift telescoping section of the mast. After the free lift stage 154 reaches its upper end of travel, the main lift cross member 198 moves upwardly from the plunger 162 as the main lift stage 156 is actuated, thereby allowing the pressure in line 168 to move the two-way valve 160 to its open position. This enables fluid to bypass the equalizing valve 164, eliminating its pressure-reducing effect. As additional hydraulic fluid is introduced through line 148 to continue lifting the load, the fluid is able to bypass the equalizing valve 164 so that the higher pressure in line 148 is available for actuating the main lift stage 156 of the lifting device 154, 156. Other types of valves or components may be used for bypassing the equalizing valve 164 when the lifting device 154, 156 is in its main lift 156 range of motion.

When retracting the lifting device 154, 156 in its main lift 156 range of movement, hydraulic fluid is permitted to flow through the two-way (or bypassing) valve 160. Once the two-way valve 160 becomes closed (when the main lift cross member 198 depresses the plunger 162) fluid is able to bypass the equalizing valve 164 by flowing through the check valve 166, which in turn provides a path for hydraulic fluid to exhaust from the free lift stage 154 as the lifting device 154, 156 is further retracted.

The check valve 166 also enables the cylinder or cylinders that comprise the lifting device 154, 156 to act as accumulators when the load-clamping 134 and load-lifting 146 selector valves are closed, thereby providing the load-lifting system 100 with full-time automatic weight-responsive force control of the load-clamping members. If, for example, there is an increase in the magnitude of sensed load weight, the check valve 166 enables fluid from the lifting device 154, 156 to automatically increase fluid to the load-clamp-closing circuitry through line 168 without concurrent actuation of either the load-clamping 134 or load-lifting 146 selector valves. Similarly, if there is a decrease in the gripping force exerted on the load, the check valve 166 enables fluid from the lifting device 154, 156 to automatically increase fluid to the load-clamp-closing circuitry without concurrent actuation of either the load-clamping 134 or load-lifting 146 selector valves.

Figure 2:
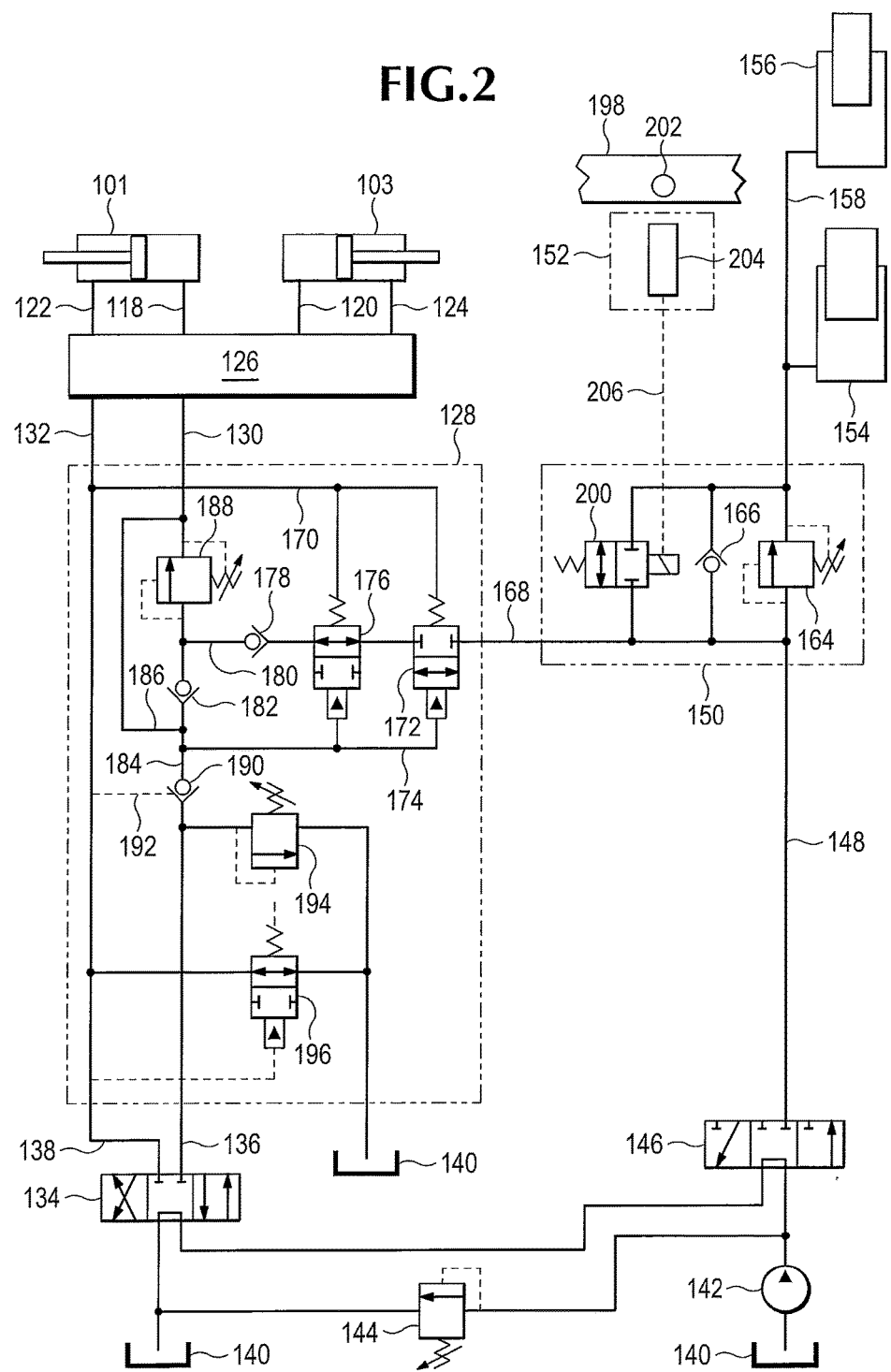
FIG. 2 is the schematic in FIG. 1 with a solenoid-controlled two-way hydraulic valve as an exemplary alternative to the plunger-activated valve in FIG. 1.

Although a valve assembly 152 comprising a plunger-activated two-way valve 160 has been described, the valve assembly 152 may comprise, for example, a switch 204 that is responsive to the extensible position of the mast and that provides an activation signal via electric wires 206 to a normally open, solenoid-activated two-way valve 200 in valve assembly 150, as shown in FIG. 2. The solenoid-activated two-way valve 200 is shown in FIG. 2 in an activated, closed position to be consistent with FIG. 1, which shows the two-way valve 160 in a closed (blocked) position for operation of the lifting device 154, 156 in its free lift 154 range of movement. In one embodiment, a switch triggering element or other device such as, for example, a target 202 may be mounted to a cross member 198 of the movable main lift section of the mast and a switch 204 (such as a proximity switch) may be mounted on the lower or fixed portion of the mast. In one embodiment, a proximity switch 204 provides an activation signal causing the solenoid-activated two-way valve 200 to remain in an activated, closed position throughout extension of the lifting device 154, 156 in its free lift 154 range of movement. After the free lift stage 154 reaches its upper end of travel, the main lift cross member 198 moves upwardly away from the fixed portion of the mast, thereby separating the switch elements and causing de-activation of the solenoid-activated two-way valve 200, which in turn moves the two-way valve 200 to its open position. This enables fluid to bypass the equalizing valve 164, eliminating its pressure-reducing effect. As additional hydraulic fluid is introduced through line 148 to continue lifting the load, the fluid is able to bypass the equalizing valve 164 so that the higher pressure in line 148 is available for actuating the main lift stage 156 of the lifting device 154, 156. Even though the switch 204 and solenoid valve 200 are electrical, they are both mounted on portions of the mast or lift truck which are fixed and do not move in response to mast extension, thereby avoiding the need for any electrical conductor which must move in response to mast extension and would therefore be exposed to hazards and durability problems. Other types of valves or components may be used for bypassing the equalizing valve 164 when the lifting device 154, 156 is in its main lift 156 range of motion.

When retracting the lifting device 154, 156 in its main lift 156 range of movement, hydraulic fluid is permitted to flow through the two-way (or bypassing) valve 200. Once the two-way valve 200 becomes closed fluid is able to bypass the equalizing valve 164 by flowing through the check valve 166, which in turn provides a path for hydraulic fluid to exhaust from the free lift stage 154 as the lifting device 154, 156 is further retracted.

Although a two-stage (i.e. free lift and main lift) lifting device has been described, additional main lift stages may be accommodated by adding equalization and bypassing valves to compensate for the higher actuation pressures required so that the sensed load weight at line 168 remains independent of the longitudinally-extensible position of the lifting device. For example, if the lifting device includes a second main lift stage beyond the single main lift stage 156 shown in FIG. 1, another equalization valve may be added in series with equalizing valve 164, and another valve for bypassing the added equalizing valve may be added for actuation of the additional (second) main lift stage when the first main lift stage 156 reaches its end of travel.

The terms and expressions which have been employed in the forgoing specification are used therein as terms of description and not of limitation, and there is no intention in the use of such terms and expressions of excluding equivalence of the features shown and described or portions thereof, it being recognized that the scope of the invention is defined and limited only by the claims which follow.

I claim:

1. A hydraulic valve circuit adapted for sensing a weight magnitude of a load supported by at least one load-engaging member that moveably translates along an elongate, longitudinally-extensible mast of a lifting device, said mast operatively engaged with a fluid power lifting actuator whose fluid pressure is variably dependent on said weight magnitude and also variably dependent on different longitudinally-extensible positions of said mast, said hydraulic valve circuit comprising at least one fluid valve assembly hydraulically interconnectable with said fluid power lifting actuator and capable of hydraulically and automatically sensing said weight magnitude from said fluid pressure such that the sensed said weight magnitude is not variably dependent on said different longitudinally-extensible positions of said mast.

2. The hydraulic valve circuit of claim 1 where said valve assembly senses said weight magnitude irrespective of said different longitudinally-extensible positions of said mast by automatically converting said fluid pressure to a pressure that is variably dependent on said weight magnitude and independent of said longitudinally-extensible position of said mast.

3. A hydraulic valve circuit adapted for sensing a weight magnitude of a load supported by at least one elongate, longitudinally-extensible lifting device having a fluid power lifting actuator whose fluid pressure is variably dependent on said weight magnitude and also variably dependent on different longitudinally-extensible positions of said lifting device, said hydraulic valve circuit comprising at least one fluid valve assembly hydraulically interconnectable with said fluid power lifting actuator and capable of automatically converting said fluid pressure to a pressure that is variably dependent on said weight magnitude but independent of said longitudinally-extensible position of said lifting device.

* * * * *